United States Patent [19]
Kilgore

[11] 3,848,662
[45] Nov. 19, 1974

[54] METHOD AND APPARATUS FOR SUPPLYING A TEMPERATURE CONDITIONED AIRFLOW TO AN OPEN COMPARTMENT IN AN EXPLOSION SUSTAINING AMBIENT SURROUNDING

[75] Inventor: Roy L. Kilgore, Marietta, Ga.
[73] Assignee: Lockheed Aircraft Corporation, Burbank, Calif.
[22] Filed: Feb. 3, 1972
[21] Appl. No.: 223,282

[52] U.S. Cl.................... 165/1, 165/61, 165/122, 165/134
[51] Int. Cl............................................. F24h 3/06
[58] Field of Search........... 165/26, 27, 42, 122, 48, 165/61, 134

[56] References Cited
UNITED STATES PATENTS
3,672,445  8/1970  Carson................................ 165/42

Primary Examiner—Charles Sukalo
Attorney, Agent, or Firm—George C. Sullivan; Albert L. Carter

[57] ABSTRACT

This invention discloses the combination of (1) a liquid temperature conditioning apparatus located exteriorly of a potential explosion sustaining zone, (2) an explosion proof air-liquid heat exchange device located within a potential explosion sustaining zone, and (3) air ducts interconnecting the air-liquid heat exchange device with the interior of a compartment open to the ambient and containing explosion sustaining vapors, such as the interior of an integral fuel tank compartment in an aircraft containing vapors arising from highly volatile hydrocarbon fuels normally carried therein. This combination further includes a closed-loop liquid circuit interconnecting the liquid temperature conditioning apparatus exterior of the explosion sustaining zone and the air-liquid heat exchange device located within the explosion sustaining zone, along with a blower means associated with the air-liquid heat exchange device whereby air ambient to the air-liquid heat exchange device within the explosion sustaining zone is temperature conditioned by being blown through an air-liquid heat exchange coil and supplied to the compartment interior.

By appropriate control of the liquid temperature conditioning apparatus, the compartment interior can be continuously supplied by temperature conditioned air that is either cooled or heated.

5 Claims, 3 Drawing Figures

METHOD AND APPARATUS FOR SUPPLYING A TEMPERATURE CONDITIONED AIRFLOW TO AN OPEN COMPARTMENT IN AN EXPLOSION SUSTAINING AMBIENT SURROUNDING

This invention concerns a method and apparatus for supplying a flow of temperature conditioned air to the interior of a compartment containing explosion sustaining vapors, the compartment being open so as to produce an explosion sustaining zone ambient to the compartment such as is occasioned when an aircraft integral fuel tank or compartment is open to permit maintenance or service personnel entry into the fuel tank compartment.

With some present day aircraft fuel compartments ranging in sizes up to a holding capacity of several thousands of gallons of highly inflammable liquid fuel of high volatility capable of producing extremely hazardous explosion sustaining vapors within the compartment, and once the fuel compartment is opened to produce a potential explosion sustaining zone ambient to the compartment, the need for providing a temperature conditioned airflow to the interior of the compartment for the comfort and fresh air safety for working personnel having to be located within the compartment represents an important personnel safety goal. By temperature conditioning, it is to be recognized that such conditioning can be of either a cooling or a heating nature in that an aircraft parked outside on a hot, sunny day can encounter temperatures as high as 140°F within the fuel compartment so as to be substantially higher than the ambient temperature, while on the other hand, on a severely cold day, while the temperature within the compartment may be just slightly above the external temperature ambient to the compartment, it may still be sufficiently low enough to require the supply of warming airflow into the compartment for comfort and ease of the working personnel to accomplish their work in a more efficient manner.

Because of the explosion sustaining zone ambient to the aircraft once the fuel compartments are open, the location of any temperature conditioning equipment within such explosion sustaining zone is almost a necessity to be of an explosion proof construction for personnel safety reasons, as believed obvious. Explosion proofing of temperature conditioning equipment of the size to supply the amount of necessary airflow to the fuel compartments becomes quite substantial from a cost viewpoint, as well as substantially large, heavy, and cumbersome equipment would be necessary so as to make portability for movement to an aircraft position rather difficult. Thusly, by locating the air temperature conditioning apparatus within the explosion sustaining zone ambient to the compartment, and at a location sufficiently proximate the open compartment for the delivery of the temperature conditioned air thereto, while at the same time locating the liquid temperature conditioning apparatus which is the portion of the overall combination presenting the greatest hazard for explosions outside of the explosion sustaining zone, a much cheaper and lighter weight (and thus greater portability) assembly or combination is attained for the indicated purpose and function.

Thusly, it is an object of this invention to provide a safe method and apparatus for providing temperature conditioned air to the interior of an open compartment containing explosion sustaining vapors.

It is a further object of this invention to provide a safe method and apparatus for providing such a temperature conditioned airflow to such a compartment that is located in an ambient explosion sustaining zone.

Still a further object of this invention is to provide a method and apparatus for providing a temperature conditioned air flow to the interior of a compartment containing explosion sustaining vapors, whether such temperature conditioning is by a heated airflow, or by a cooling airflow.

Yet another object of this invention is to provide a temperature conditioned airflow to an open compartment of an explosion sustaining atmosphere in an ambient explosion sustaining zone by apparatus that has a high degree of portability, of minimal or lightweight construction and thus at minimum cost, and yet with a high degree of safety.

Other objects and advantages of this invention will become apparent from the following description taken in conjunction with the accompanying drawings in which.

Generally stated, this invention comprises a method and apparatus for supplying temperature conditioned air to an explosion sustaining vapor containing compartment open to the ambient whereby a potential explosion sustaining zone ambient to the compartment is susceptible; the temperature conditioned airflow supply accomplished by a liquid conditioning apparatus located outside of the explosion sustaining zone and connected to an explosion proof air-liquid heat exchange device located within the explosion sustaining zone through a closed loop liquid circulating circuit. Ambient air in the explosion sustaining zone is blown over heat exchange coils containing the temperature conditioned liquid, and from there ducted by one or more flexible air ducts into one or more compartments. By appropriate regulation of the liquid temperature conditioning apparatus, the circulated liquid may be cooled or heated whereupon cooled or heated air, respectively, is delivered to the compartment interior.

Figure 1:
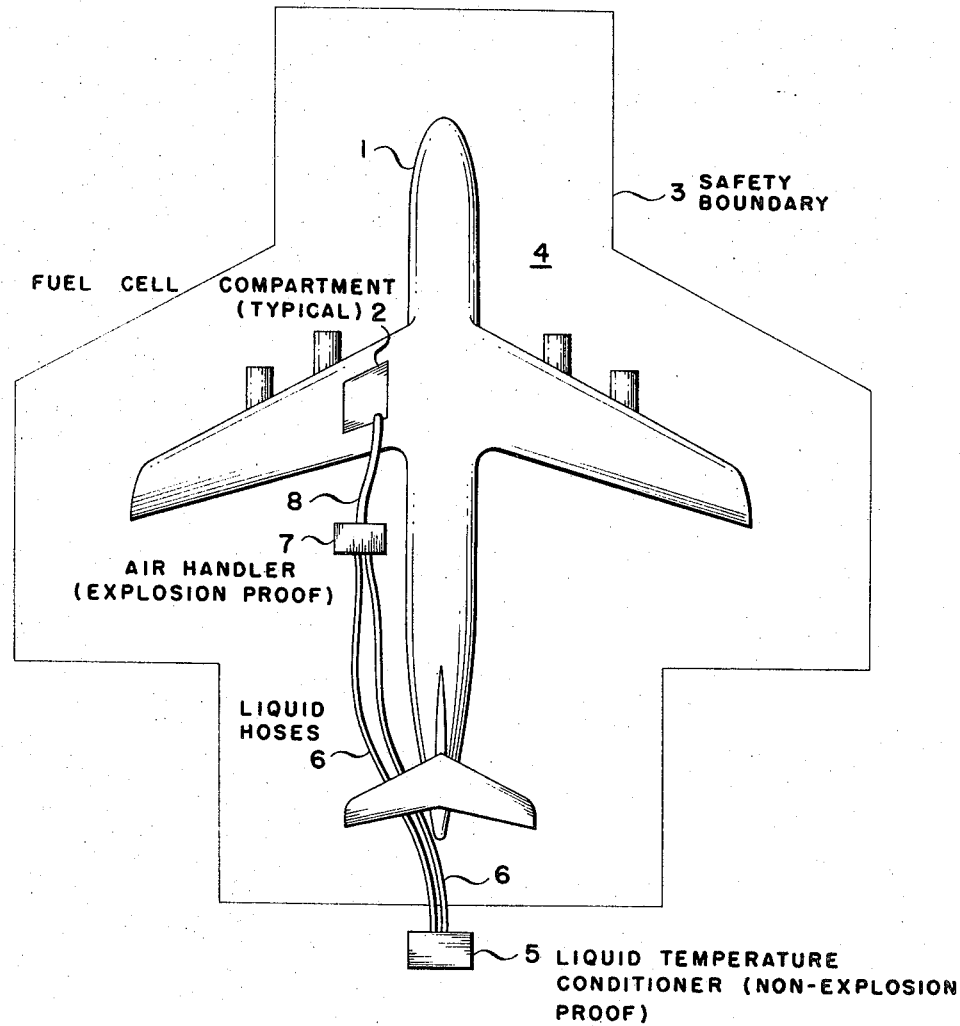
FIG. 1 represents a general schematic arrangement of one embodiment of this invention showing the relative lay-out of the apparatus to accomplish and practice this invention when located relative to an aircraft having an open fuel cell compartment.

More particularly, there is shown in FIG. 1 an aircraft 1 with a typical integral fuel cell compartment 2, which when open to the atmosphere presents an ambient explosion sustaining vapor proximate the aircraft due to the high volatility of the fuel conventionally kept within the fuel cell or compartment 2 which is normally closed during conventional operation of the aircraft. When compartment 2 is open, the presence of the explosion sustaining vapors proximate aircraft 1 establishes an area or zone proximate the aircraft defined by safety boundary lines 3 which in turn defines a susceptible explosion sustaining zone 4; the practicality of safe operation being that operating equipment permitted within the explosion sustaining zone 4 defined by safety boundary limits 3 should be explosion proof equipment.

The fuel cell compartment 2 has need and occasion to be opened for maintenance or repair personnel to enter the compartment to perform such functions as replacement of equipment contained within the compartment, repair or overhaul of the sealing systems therein, etc., and with residual fuel and vapors within compartment 2 being present within the compartment at temperatures which are uncomfortable for the personnel, the delivery of a temperature conditioned fresh air (relative to the compartment atmosphere and temperature) flow is desirable. In this regard, there is provided a liquid temperature conditioning apparatus 5 located outside of the explosion sustaining zone 4 and interconnected by a supply and return pair of liquid hoses 6 to an air-liquid heat exchange apparatus 7 located within the explosion sustaining zone 4. An appropriate explosion proof motor controlled fan or blower supplies ambient air from within the explosion sustaining zone 4 to the interior or compartment 2 through one or more flexible air ducts 8 extending from the air-liquid heat exchange apparatus 7 to compartment 2.

Figure 2:
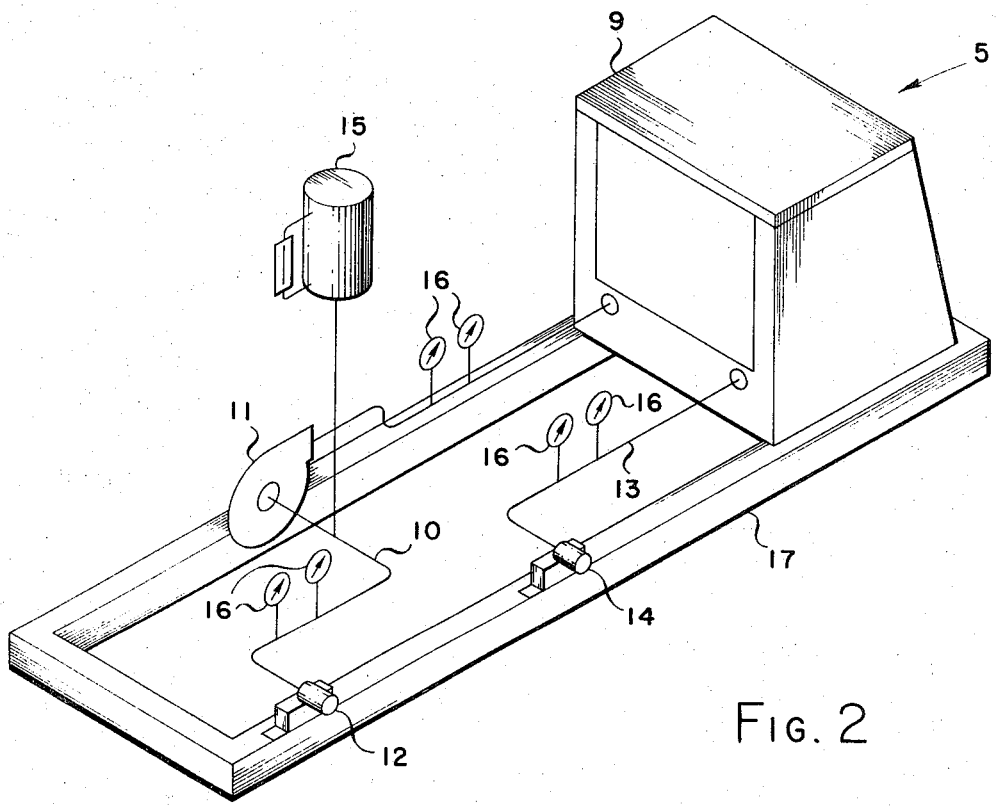
FIG. 2 is a perspective view of the liquid temperature conditioning apparatus located outside of the explosion sustaining zone involved in the accomplishment and practice of this invention.

Referring to FIG. 2, the liquid temperature conditioning apparatus 5 consists of a heating and/or chilling unit for liquid of any appropriate and conventional structure with a heating and/or cooling capacity appropriate for the desired or appropriate level of heating and/or cooling; the specific constructional details of this heating-chilling unit 9 not involved or concerned in the details of this invention other than it preferably provide selective operational control whereby the degree of level of temperature conditioning can be varied and/or controlled. The circulating liquid is supplied to unit 9 through an intake or supply line 10 by a pump 11; the line 10 connected by connector 12 to one of the liquid hoses 6 interconnecting apparatus 5 with the air-liquid heat exchange apparatus 7. The supply of temperature conditioned liquid is accomplished through delivery line 13 which in turn is connected through connector 14 to one of the liquid hoses 6 interconnecting apparatus 5 with the air-liquid heat exchange apparatus 7.

An expansion tank 15 located in the intake or supply line 10 compensates for temperature expansion and contraction of the liquid volume contained in the closed circuit or loop. Likewise, appropriate pressure and temperature indicators 16 may be located within lines 10 and 13 as desired and appropriate, as well as any other liquid flow controls, such as valves, pressure regulators, etc.

As shown in the drawing, the liquid temperature conditioning apparatus 5 may be mounted in any appropriate manner on a base 17 which could constitute the frame of a wheeled vehicle, the same as any such base 17 could be of a nature to be mounted on the bed of another vehicle for portability.

Figure 3:
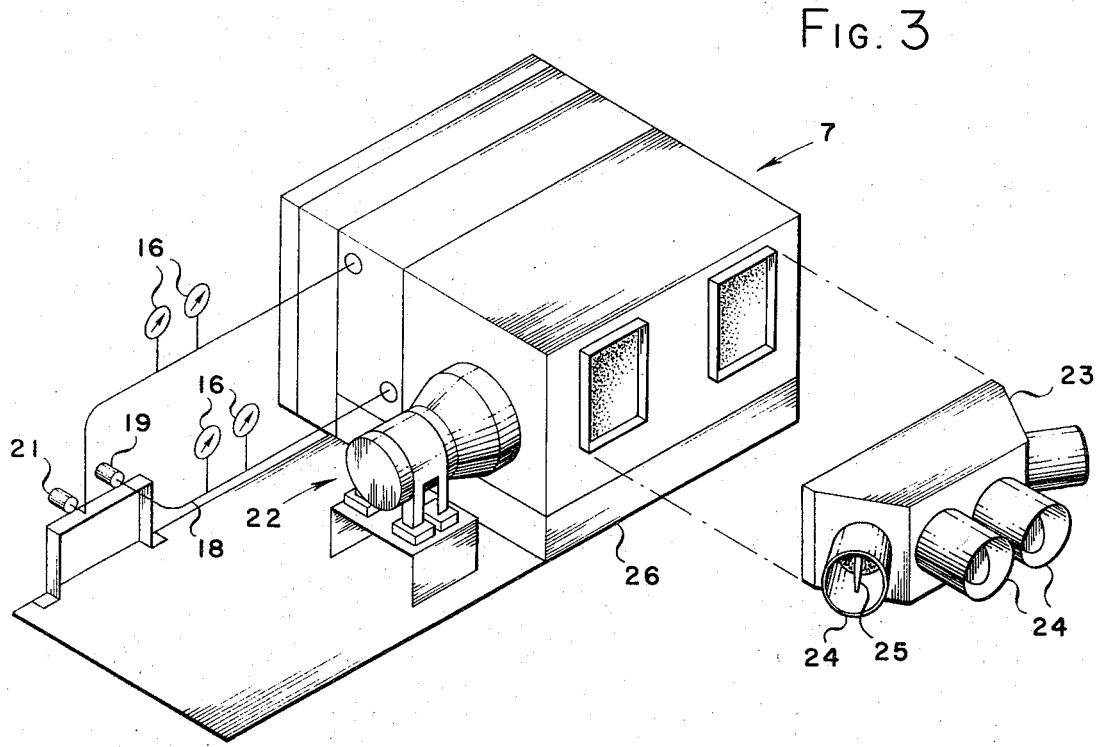
FIG. 3 is a perspective of the air-liquid heat exchange device located within the explosion sustaining zone involved in the accomplishment and practice of this invention.

Referring now to FIG. 3, the air-liquid heat exchange apparatus 7 comprises a compartmented air-liquid heat exchange coil receiving temperature conditioned liquid through supply delivery line 18 connected to the liquid temperature conditioning apparatus 5 by a liquid hose 6 and connector 19, with the liquid being returned to the liquid temperature conditioning apparatus 5 through return line 20, connector 21 and a liquid hose 6. An explosion proof electrical motor 22 is connected to an appropriate blower (now shown) duct contained within apparatus 7 located adjacent or proximate the coil to such or blow external ambient air into apparatus 7 and over the air-liquid coil for delivery to an airflow manifold 23 having at least one airflow delivery nozzle 24 directed therefrom each of which is controlled by a separate or independent damper 25. For the ultimate in safety, yet not mandatory to the practice of this invention, it may be preferable to utilize a blower of the non-sparking type. An appropriate flexible air duct 8 (see FIG. 1) is connected or mounted upon the air delivery nozzles 24 with the air ducts 8 being of a length sufficient to extend into the fuel cell compartment 2 for delivery of temperature conditioned airflow thereto as discussed above.

The air-liquid heat exchange apparatus 7 can be mounted on a base or truck bed 26 for portability in the same manner as discussed above relative to the liquid temperature conditioning apparatus 5 being mounted on its base or truck bed 17, and the delivery line 18 and return line 20 can incorporate any appropriate pressure-temperature indicators 16 in the same manner as lines 10 and 13 associated with the liquid temperature conditioning apparatus 5 described above.

The liquid utilized in the closed circuit described above may be water or a water-glycol mixture, or any other appropriate liquid capable of functioning as a liquid heat exchange medium.

In operation, the liquid temperature conditioning apparatus 5, located outside of the potential explosion sustaining zone 4, is operated to prepare and supply temperature conditioned liquid (chilled if a cool airflow relative to the ambient temperature is to be supplied to compartment 2 or heated if a warm airflow relative to the ambient temperature is to be supplied to compartment 2) to the explosion-proof air-liquid heat exchange apparatus 7 located within explosion sustaining zone 4. As the temperature conditioned liquid flows through a liquid coil in apparatus 7, air from zone 4 ambient to apparatus 7 is mechanically directed over the coil in a heat exchange relationship by which it is warmed or cooled, and then directed into the interior of compartment 2. Thusly, with an aircraft parked outside during a normal summer day whereby it would not be uncommon for the temperature of a fuel compartment to reach as high as 140°F., a cooling airflow may be supplied, while on the other hand, during a period in which the aircraft has been parked in cold or subfreezing temperatures, a warming airflow may be supplied to the compartment. In either case or extreme, a temperature conditioned airflow supply is accomplished with a high degree of safety and portability, and yet at minimal equipment complexity, cumbersomeness and cost, by practice of this invention.

It is further to be recognized that this invention may be practiced whether the aircraft is located in the open outdoors, or located within the interior or confines of a large aircraft hangar.

While one particular embodiment has been illustrated and described, it will be apparent to those skilled in the art that various modifications and changes may be made without departing from the invention, and it is intended to cover in the appended claims all such changes and modifications that come within the true spirit and scope of the invention.

What is claimed is:

1. A method of supplying temperature conditioned, ambient air to the interior of a compartment open to the ambient and containing explosion sustaining vapors at a compartment temperature in the range of from approximate the ambient temperature up to approximately 50°F. above the ambient temperature, said open compartment further producing an explosion sustaining zone ambient to the compartment, said method comprising the steps of:

temperature conditioning a liquid at a location exterior to the explosion sustaining zone;

circulating said temperature conditioned liquid to an explosion proof heat exchange means located within the explosion sustaining zone, and returning said liquid out of the explosion sustaining zone for recycling of the temperature conditioning;

blowing explosion sustaining zone air into contact with the heat exchange means and thus heat exchange relationship relative to the temperature conditioned liquid whereby said air becomes temperature conditioned; and supplying said temperature conditioned ambient air to the interior of the compartment.

2. The method of claim 1 wherein said temperature conditioning of the liquid is cooling and cooled ambient air is supplied to said compartment.

3. The method of claim 1 wherein said temperature conditioning of the liquid is heating and heated ambient air is supplied to said compartment.

4. The method of claim 1 wherein the liquid that is temperature conditioned is water.

5. The method of claim 1 wherein the liquid that is temperature conditioned is a water-glycol mixture.

* * * * *